United States Patent
Mansell et al.

(10) Patent No.: US 11,269,634 B2
(45) Date of Patent: Mar. 8, 2022

(54) DATA STRUCTURE RELINQUISHING

(71) Applicant: Arm Limited, Cambridge (GB)

(72) Inventors: David Hennah Mansell, Norwich (GB); Nigel John Stephens, Cambridge (GB); Matthew Lucien Evans, Cambridge (GB)

(73) Assignee: Arm Limited, Cambridge (GB)

( * ) Notice: Subject to any disclaimer, the term of this patent is extended or adjusted under 35 U.S.C. 154(b) by 15 days.

(21) Appl. No.: 16/531,206

(22) Filed: Aug. 5, 2019

(65) Prior Publication Data
US 2021/0042114 A1    Feb. 11, 2021

(51) Int. Cl.
*G06F 9/22* (2006.01)
*G06F 9/30* (2018.01)
*G06F 9/38* (2018.01)

(52) U.S. Cl.
CPC .......... *G06F 9/3012* (2013.01); *G06F 9/3842* (2013.01)

(58) Field of Classification Search
None
See application file for complete search history.

(56) References Cited

U.S. PATENT DOCUMENTS

| 5,553,256 A * | 9/1996 | Fetterman ........... G06F 9/30167 711/204 |
| 6,101,597 A * | 8/2000 | Colwell ................. G06F 9/383 712/218 |
| 9,182,986 B2 * | 11/2015 | Rajwar ............... G06F 9/30145 |
| 10,061,588 B2 * | 8/2018 | Gschwind ............. G06F 9/462 |
| 2001/0004755 A1 | 6/2001 | Levy et al. |
| 2019/0220417 A1 * | 7/2019 | Williamson ............ G06F 8/441 |

OTHER PUBLICATIONS

International Search Report and Written Opinion of the International Searching Authority for PCT/GB2020/050800 dated Jun. 23, 2020, 17 pages.
H.S. Stone, Technique for Reducing the Number of Registers Saved at a Context Swap, IBM Technical Disclosure Bulletin, vol. 33, No. 3A, Aug. 1, 1990, 3 pages.

* cited by examiner

*Primary Examiner* — Cheng Yuan Tseng
(74) *Attorney, Agent, or Firm* — Nixon & Vanderhye P.C.

(57) ABSTRACT

A data processing apparatus is provided comprising: a plurality of storage circuits to store data. Execution circuitry performs one or more operations using the storage circuits in response to instructions. The instructions include a relinquish instruction. The execution circuitry responds to the relinquish instruction by indicating that at least one of the plurality of storage circuits is an unused storage circuit and the execution circuitry affects execution of future instructions based on the unused storage circuit after executing the relinquish instruction.

14 Claims, 9 Drawing Sheets

```
              1    LOAD     MA0
              2    LOAD     MB0
                   loop:
              3    LOAD     MB1
              4    MATMUL   MC0, MA0, MB0
              5    LOAD     MA1
              6    MATMUL   MC1, MA0, MB1
              7    LOAD     MA0
              8    MATMUL   MC2, MA1, MB0
              9    LOAD     MB0
              10   MATMUL   MC3, MA1, MB1
              11   SUBS     Count, Count, #1
KILL MB1 ─→   12   BNE      Loop
```

FIG. 4

```
save_context:
1   MRS    x0,   [ALIVE_REGS_BITMASK]
2   STR    x0,   [context_ptr]!
3   TBZ    x0,   #1,   not_ma0
4   STR    MA0,  [context_ptr]!
not_ma0:
5   TBZ    x0,   #2,   not_ma1
6   STR    MA1,  [context_ptr]!
not_ma1:
7   TBZ    x0,   #3,   not_mb0
8   STR    MB0,  [context_ptr]!
not_mb0:
        .
        .
        .
        .
```

FIG. 6

```
    load_context:
1   KILL_ALL
2   LDR       x0,    [context_ptr]!
3   TBZ       x0,    #1,    not_ma0
4   LDR       MA0,   [context_ptr]!
    not_ma0:
5   TBZ       x0,    #2,    not_ma1
6   LDR       MA1,   [context_ptr]!
    not_ma1:
             .
             .
             .
             .
```

FIG. 8

DATA STRUCTURE RELINQUISHING

TECHNICAL FIELD

The present disclosure relates to data processing. The present disclosure could, for instance, have relevance to data processing devices that use storage circuits, such as registers, to store data.

DESCRIPTION

A data processing apparatus may comprise one or more storage circuits, such as registers used for storing data values during processing. Such data values can be operated on by instructions. However, at a given period of time, some of the data values will no longer be of use. However, the presence of such data values can affect the execution of future instructions. For instance, if a branch is speculatively taken and an instruction seeks to use a register as a destination register then a stall might occur until it can be determined whether the branch was speculatively taken correctly. This is because an instruction on the non-taken branch might use a register as a source and it may not be possible to "rewind" the speculatively taken branch once the value in the register has been overwritten. Meanwhile context switching causes the state of registers to be saved so that those registers can be used by a different process. However, since each register may have to be saved, the presence of each register adds to the time taken for the context switch to occur. It is desirable to improve the efficiency of such a data processing apparatus.

SUMMARY

Viewed from a first example configuration, there is provided a data processing apparatus comprising: a plurality of storage circuits to store data; and execution circuitry to perform one or more operations using the storage circuits in response to instructions, wherein the instructions include a relinquish instruction; the execution circuitry is adapted to respond to the relinquish instruction by indicating that at least one of the plurality of storage circuits is an unused storage circuit; and the execution circuitry is adapted to affect execution of future instructions based on the unused storage circuit after executing the relinquish instruction.

Viewed from a second example configuration, there is provided a method of data processing comprising: storing data in a plurality of storage circuits; performing one or more operations using the storage circuits in response to instructions including a relinquish instruction; indicating, in response to the relinquish instruction, that at least one of the plurality of storage circuits is an unused storage circuit; and affecting execution of future instructions based on the unused storage circuit after executing the relinquish instruction.

Viewed from a third example configuration, there is provided a data processing apparatus comprising: means for storing data in a plurality of storage circuits; means for performing one or more operations using the storage circuits in response to instructions including a relinquish instruction; means for indicating, in response to the relinquish instruction, that at least one of the plurality of storage circuits is an unused storage circuit; and means for affecting execution of future instructions based on the unused storage circuit after executing the relinquish instruction.

BRIEF DESCRIPTION OF THE DRAWINGS

The present invention will be described further, by way of example only, with reference to embodiments thereof as illustrated in the accompanying drawings, in which:

FIG. 4 illustrates an example of how storage circuit relinquishing can aid speculation in accordance with some embodiments;

FIG. 6 shows an example of saving context during a context switch when storage circuits such as registers have been relinquished in accordance with some embodiments;

FIG. 8 shows an example of loading context during a context switch when registers have been relinquished in accordance with some embodiments.

DESCRIPTION OF EXAMPLE EMBODIMENTS

Figure 1:
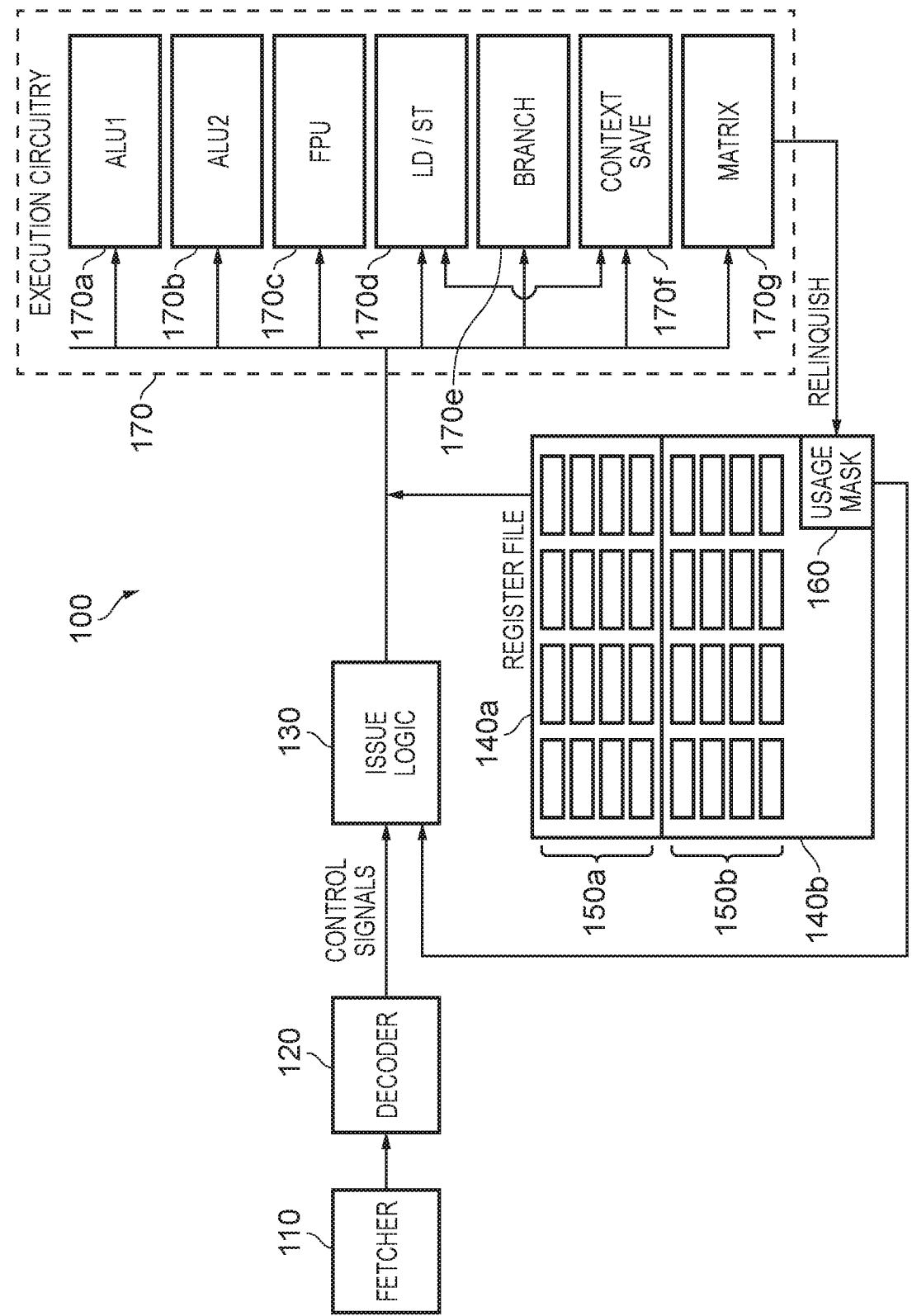
FIG. 1 schematically illustrates a data processing apparatus in accordance with some embodiments.

Before discussing the embodiments with reference to the accompanying figures, the following description of embodiments is provided.

In accordance with some example configurations there is provided a data processing apparatus comprising: a plurality of storage circuits to store data; and execution circuitry to perform one or more operations using the storage circuits in response to instructions, wherein the instructions include a relinquish instruction; the execution circuitry is adapted to respond to the relinquish instruction by indicating that at least one of the plurality of storage circuits is an unused storage circuit; and the execution circuitry is adapted to affect execution of future instructions based on the unused storage circuit after executing the relinquish instruction.

In the above example configurations, the relinquish instruction is used to indicate that the value stored in a particular storage circuit (e.g. the data value stored in that storage circuit) is no longer used. This state of 'not being used' persists until the storage circuit is next accessed (e.g. written to), at which point the value changes and so the state of the storage circuit becomes 'used' once again. In some embodiments, there may be an explicit instruction provided to indicate that the storage circuit is now 'in use'. In any event, the execution of at least some future instructions is affected (e.g. modified) based on the storage circuit having such a state. Note that future instructions could actually appear earlier in the program due to, e.g. branches or other control flow instructions. The relinquish instruction need not be a dedicated instruction, but could instead be a regular instruction that performs the function of relinquishing the storage circuit. In this way, storage circuits that are no longer used can be indicated as such and so the execution of future instructions may be made more efficient by taking such storage circuits into account. The process of determining whether a given storage circuit is no longer used can be performed by a compiler and/or by a programmer. Given that, at the time of compilation/programming, the overall program can be analysed to determine whether a given value is used any more, it is possible for such information to be provided as part of the program for the data processing apparatus.

In accordance with some example configurations the data processing apparatus comprises context saving circuitry to save a set of the storage circuits in response to a context switch, wherein the future instructions comprise one or more context switching instructions to perform the context switch. Context saving circuitry may be used during a context switch in which the data processing apparatus switches from the execution of one application to another application, for example. During the context switch, it is necessary for the contents associated with a set of the storage circuits to be saved (e.g. to a main memory) so that the following application can make use of those storage circuits without the data currently in those storage circuits being lost.

In some examples the context saving circuitry is adapted to inhibit saving the unused storage circuit. By inhibiting saving the unused storage circuit, the process of performing the context save can be sped up as a consequence of having less data to store. It therefore increases the efficiency of the context saving process as well as decreasing the amount of storage necessary in order to store the current context.

In some examples the context saving circuitry is adapted to save the plurality of storage circuits other than the unused storage circuit. In such embodiments the set of storage circuits, excluding the unused storage circuits, is saved.

In some examples, the context saving circuitry is adapted to save an identity of either the unused storage circuit or those of the storage circuits that are other than unused. Consequently either the identities of the unused storage circuits are saved or the identities of the used storage circuits are saved. In either case, it is possible to determine how and where to insert the saved values back into the storage circuits when the application is to be resumed. Where there are numerous unused storage circuits, the identity of each of the unused storage circuits may be stored so that each of the saved values can be restored to its correct location. As an initial step in the restoration process, the current value of the set of storage circuits may be reset so that those storage circuits that are not being restored will be erased. Consequently, the data used by the application that is being switched out cannot be read by the application that is being switched in even if it behaves unexpectedly.

In some examples, the data processing apparatus comprises issue circuitry to receive the instructions in stream order and to issue the instructions to the execution circuitry in a revised order other than the stream order. Issue circuitry may be used in order to execute instructions out-of-order. In particular, the issue circuitry may receive the instructions in a stream order and then provide the instructions (or operations/control signals corresponding to those instructions) to a queue where they can be executed in any order subject to data dependencies between the instructions. In this way, instructions can be executed in parallel provided that multiple execution circuits exist. Furthermore, by executing instructions out-of-order, it is possible to limit the effect of data dependencies between instructions so that instructions need not stop executing as a consequence of data dependencies between other instructions.

In some examples, the stream order comprises the relinquish instruction, followed by a branch instruction, followed by a producer instruction; the branch instruction is predicted as being taken; the producer instruction stores a second data value in the unused storage circuit; and the revised order causes the producer instruction to be issued before the branch has completed. In these examples, the relinquish instruction is used to indicate that a storage circuit holding the first data value is no longer being used. As a consequence of this, it is possible for the producer instruction (which is at the branch target) to begin execution while the branch is still speculative (e.g. has not completed). This is because the relinquish instruction has indicated that the storage circuit that stores the first data value will no longer be used. Consequently, the storage circuit holding that data can be used by the producer instruction to store the second data value. Ordinarily, if the control flow was uncertain (e.g. due to a conditional branch) then the processor would be unable to speculatively execute the producer instruction because if the branch was predicted incorrectly, there may yet be a consumer instruction on the correct program flow that reads the old value. The relinquish mechanism makes it possible to state that this is not the case and thus enables the speculation to proceed. In some examples, a consumer instruction that reads a first data value from the unused storage circuit precedes the relinquish instruction. Consumer instructions can be considered to be instructions that make use of a particular data value (as opposed to producer instructions, which can be considered to be instructions that provide data values for use by consumer instructions). Hence, where a consumer instruction precedes the relinquish instruction, the producer instruction is executed after the consumer instruction has finished reading the register that is the subject of the relinquish instruction.

In some examples, the consumer instruction executes over a plurality of processor cycles. Where the consumer instruction executes over a plurality of processor cycles, the ability to execute other instructions such as the producer instruction before the consumer instruction has completed makes it possible to perform other operations rather than stalling until the consumer instruction completes.

In some examples, the consumer instruction is a matrix operation instruction. Other examples of instructions that execute over a number of processor cycles may include divide instructions and memory access instructions.

In some examples, each of the plurality of storage circuits is simultaneously addressable. As a consequence of the plurality of storage circuits being simultaneously addressable, it is possible for any of those storage circuits to be accessed at any one time. This can be useful for some algorithms such as matrix multiply whose efficiency can be improved by adding addressable storage circuitry. This is not always possible in all architectures. In particular, a particular architecture may have a vast number of storage circuits available, of which only a subset can be addressed at any one instant. This allows the data processing apparatus to create the illusion of increased storage circuit availability. For instance, if multiple instructions store data in a register (storage circuit) R3, then multiple copies of the register R3 can be provided so that, for each speculative flow, a new R3 register can be allocated. If the speculation proves incorrect, the previous copy of R3 can be "restored". Such a technique is known as renaming. Renaming requires a large number of resources to be made available and may be considered to be impractical for particularly large registers due to the amount of circuitry required. By providing more addressable storage rather than using the same storage space to provide renaming registers, it is possible to improve the efficiency of algorithms such as matrix multiply. By then being able to 'relinquish' registers that are unused, the number of registers that need to be saved during a context switch can be reduced.

In some examples, each of the plurality of storage circuits is adapted to store a plurality of data values each of the plurality of storage circuits is adapted to store a plurality of data values. By providing a storage circuit that is adapted to store a plurality of data values, complex data structures can be catered to. For instance, such storage circuits may be configured to store all of the data values relating to a matrix so that an operation can be performed on the entire matrix at once.

In some examples, each of the plurality of storage circuits has capacity of at least 1 KiB. In other words, each of the plurality of storage circuits may have a capacity of 1024 bytes. Such storage circuits may be used in order to store a plurality of data values. In particular, the size of the individual data values may be varied. For instance, 1024 8-bit values could be stored, or 256 32-bit values can be stored.

In some examples, the execution circuitry is adapted to respond to the relinquish instruction by performing at least some of the one or more operations and to indicate that the one of the plurality of storage circuits as the unused storage circuit. Accordingly, the relinquish instruction may perform a number of different purposes. For instance, the relinquish instruction may be a regular instruction that makes use of one or more data values stored in storage circuits as well as indicating that one or more of those storage circuits is no longer used. In this way, a dedicated relinquish instruction need not be provided as part of the instruction set. Furthermore, programs can be made more efficient by enabling the relinquishment of a storage circuit as part of another instruction.

There are a number of ways of indicating that a particular instruction is to be used to perform a relinquish operation. However, in some examples, at least some of the instructions comprise a field to indicate whether that instruction is the relinquish instruction. An instruction may be compiled to a machine-language instruction made up of an opcode that identifies the instruction to be performed and one or more parameters. In these examples, one or more of the parameters is a single bit associated with a storage circuit (e.g. register) reference, that indicates whether that storage circuit is to be marked as being unused. As a consequence of one or more of these fields in the machine-language instruction being set, the instruction is recognised as a relinquish instruction and the specific storage circuit is relinquished.

In some examples, the data processing apparatus comprises track circuitry to identify one or more unused storage circuits including the unused storage circuit. The track circuitry may therefore be used in order to indicate the identity of the storage circuit or storage circuits that are unused. Where only a single storage circuit may be marked as unused, the mask circuitry may simply encode an identification of that storage circuit. In other examples, where the number of unused storage circuits could be greater than one, a mask may be provided to encode (e.g. using bit-wise encoding) those storage circuits that are used. In either event, the relinquish instruction may be used in order to update the value stored in the track circuitry. Similarly, the value stored in the track circuitry may also be updated to indicate that a particular register is used as a consequence of that value in that storage circuit being changed.

In some examples, the storage circuits are registers; and the unused storage circuit is an unused register in the registers.

Particular embodiments will now be described with reference to the figures.

FIG. 1 schematically illustrates a data processing apparatus 100 in accordance with some embodiments. The apparatus 100 includes a fetcher 110, which is responsible for fetching instructions from, for instance, either a main memory or an instruction cache. The fetched instructions are accessed by a decoder 120, which decodes the fetched instructions into one or more control signals that represent individual operations. The operations are passed to issue logic 130, which is responsible for issuing and scheduling the operations that make up the instructions. From here, the instructions are issued to one or more execution circuits 170. In this example, the execution units 170 include an arithmetic logic unit (ALU) 170a, a second arithmetic unit (ALU) 170b, a floating point unit (FPU) 170c, a load/store unit 170d, a branch unit 170e, a context saving unit 170f, and a matrix operation unit 170g. The apparatus 100 includes a register file 140a, 140b. The register file is made up of two parts—a first part 140a containing general purpose registers 150a and a second part 140b containing specific registers 150b that are reserved for, in this case, matrix operations. Here, the registers 150b are an example of the claimed storage circuits. During execution of the instructions, data from the general-purpose registers 150a in the register file 140a may be passed to any of the execution units 170. However, data from the specific registers 150b can only be accessed by the load/store unit 170d and the matrix operation unit 170g.

One or more of the execution units 170, such as the matrix operation unit 170g, executes an operation corresponding with a relinquish instruction in the instructions fetched by the fetcher 110. The relinquish instruction is used to indicate that one or more specific registers 150b in the register file 140b are no longer required. Such lack of requirement persists until such time as a new data value is stored within that register. The relinquish instruction that is executed by one of the execution circuits 170 causes a usage mask 160 held within the register file 140b to be updated. The usage mask 160 indicates the set of the specific registers 150b that are currently used (i.e. not relinquished). Of course, in other embodiments, the usage mask 160 could be used to indicate those of the specific registers 150b that have been relinquished. In this embodiment, the usage mask 160 is also made available to the issue logic 130 for the purposes of speculation as will be indicated later.

Figures 2A, 2B, 2C:
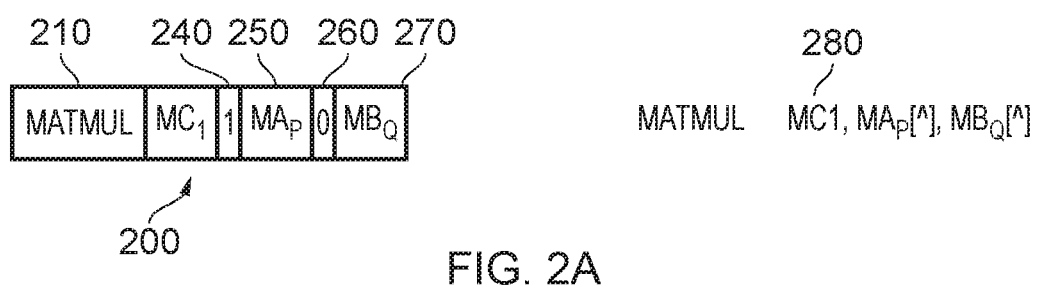
FIGS. 2A, 2B, and 2C show three different examples of relinquish instructions in accordance with some embodiments.

FIG. 2A shows an example of the relinquish instruction 280. In this case, the relinquish instruction takes the form of a matrix multiplication instruction. That is to say that the matrix multiplication instruction has a relinquish capability and thus is an example of a relinquish instruction even though the instruction actually performs a further operation of matrix multiplication. In this example, the instruction 280 includes three parameters—a first reference to a register MC1, a second reference to a register $MA_P$, and a third reference to a register $MB_Q$. In this instruction 280, the last two references can be suffixed with a particular symbol (^). This indicates that, having made use of the values stored within those registers, those registers are to be relinquished. The machine-language form 200 of this instruction 280 is also illustrated in FIG. 2A. In particular, the instruction is made up from an opcode 210 that uniquely identifies the particular instruction, the three register references 230, 250, 270, each of which may identify a register in binary (one of the registers 230 being a destination of the result of the operation and the other two 250, 270 being sources for inputs of the operation). The instruction 200 also includes two relinquish bits 240, 260, each of which is associated with one of the source register references 250, 270. A value of '1' in respect of one of these bits means that the corresponding register is to be relinquished once the instruction has been issued and the data has been extracted from the register in question. Meanwhile, a value of '0' indicates that the data value is to be used and the register is not to be relinquished. In the current example, the setting of the relinquish bit 240 associated with the first register reference $MA_P$ 250 and not for the second relinquish bit 260 associated with the second register reference $MB_Q$ 270 corresponds with the instruction:

MATMUL MC1, $MA_P\hat{}$, $MB_Q$

FIG. 2B illustrates another example of the relinquish instruction. In this example, the relinquish instruction 290 takes the form of an explicit relinquish instruction that has no further operational purpose. Here, the instruction 290 includes an explicit register reference MA0. Consequently, when this instruction is executed, the register MA0 will be relinquished.

FIG. 2C shows a third example of a relinquish instruction. In this example, the instruction 295 includes a mask that can be used to identify a number of different registers. In this example, the mask is 00110111. This mask may be interpreted to mean that register numbers 0, 1, 2, 4 and 5 are be immediately relinquished while registers 3, 6, and 7 are not to be relinquished.

It will be appreciated that other formulations of the relinquish instruction may also be used without deviating from the present technique. Furthermore, the use of particular bit values (such as 1) to indicate that a particular register is to be relinquished could also be inverted to instead represent the fact that the register should not be relinquished.

Figure 3:
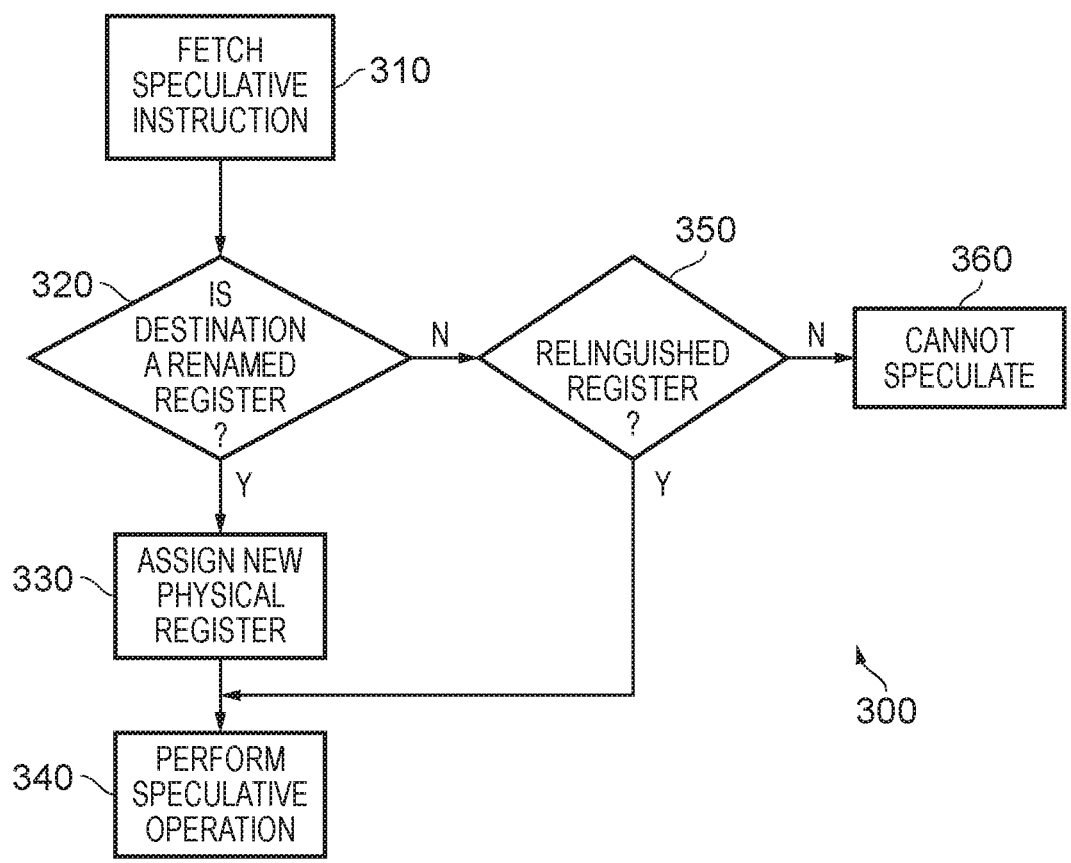
FIG. 3 shows a flowchart that illustrates a method of speculative execution in accordance with some embodiments.

FIG. 3 illustrates a flow chart 300 that shows a method of using speculative execution in combination with the set of relinquished registers in accordance with some embodiments. The process begins at a step 310 where a (potentially) speculative execution is fetched. At a step 320, it is determined whether the destination register of the instruction (e.g. the register to which a result is to be written) is a register for which renaming occurs or not. For instance, this may correspond with the general-purpose registers 150a. If the destination register is a renamed register, then at step 330 a new physical register is assigned to act as the destination register for the instruction and at step 340 a speculative operation is performed based on the instruction using the assigned physical register.

However, the present technique also makes it possible to perform speculation when a destination register is not a renamed register, i.e. where the register is one of the specific registers 150b. In particular, if at step 320 it is determined that the destination register is not a renamed register, then at step 350 it is determined whether the destination register is a relinquished register. If not, then at step 360 the instruction cannot be speculatively executed and so must be executed non-speculatively. Alternatively, if at step 350 it is determined that the register is a relinquished register, then the process proceeds to step 340 where a speculative operation corresponding with that instruction can be performed. It is possible to perform a speculative operation using a relinquished register since the relinquished register is no longer being used by the application. Consequently, the application has no current interest in that register and so in the event of a mis-speculation, the register can safely be returned to the relinquished state without losing data.

FIG. 4 illustrates an example of how register relinquishing can aid speculation in accordance with some embodiments. In particular, FIG. 4 illustrates an example of a program in which a series of matrix multiplications is performed. At lines one and two, data values (e.g. matrixes) are loaded into registers MA0 and MB0. A loop then begins between instructions three and twelve. Within this loop, at instruction three, a further data value (e.g. matrix) is loaded into register MB1. At instruction four, a matrix multiplication takes place by multiplying the matrix stored in MA0 by the matrix stored in MB0, with the result being stored in register MC0. At an instruction five, a new matrix is loaded into register MA0 and at instruction six the matrix multiplication MA0×MB1=MC1 is performed. A further load into register MA0 takes place at instruction seven. At instruction eight a further matrix multiplication MA1×MB0=MC2 occurs. At an instruction nine, a matrix is loaded into register MB0. At instruction ten, a further matrix multiplication of MA1×MB1=MC3 occurs. At an instruction eleven, the value of a variable 'count' is decreased by one. At a line twelve, it is tested to see whether the result of the decrement occurring at instruction eleven caused the value of 'count' to reach zero. If not, then the process returns to the label marked loop between instructions two and three. Otherwise, the rest of the program (not illustrated) continues.

The matrix multiplication instructions are expected to take a number of processor cycles in order to execute. In order to prevent a stall, during execution of instruction ten, the remaining instructions may be executed with a prediction being made regarding the outcome of the branch instruction twelve. However, this causes a potential problem when instruction three executes. In particular, instruction three will cause the value stored in register MB1 to be overwritten. Hence, if the prediction is incorrect, then the value stored in register MB1 will be lost. Clearly this is not acceptable because some instruction after the loop might read MB1. To some extent, this could be resolved using register renaming (previously mentioned). This assigns different registers to conflicting instructions such as instruction three. Hence, if the branch was predicted incorrectly, it is only necessary to discard the contents of the physical register supplied to that particular invocation of instruction three in the loop. However, register renaming requires multiple copies of registers to be provided. In a situation in which large registers are provided (such as this) then the cost of register renaming becomes prohibitive. Ordinarily therefore, a choice must be made between providing a large number of large registers, or stalling on branch instructions.

The use of the relinquish instruction can be used to inhibit such stalling without resorting to increases in the number of registers. In particular, by inserting a relinquish instruction between instructions eleven and twelve to specifically indicate that register MB1 is no longer required, instruction three can execute with impunity. In particular, if it is determined that the branch should not have been taken, and the contents of register MB1 were overwritten by instruction three, then the contents of register MB1 can simply be erased. This is because the content of MB1 is no longer required by the program and hence can be set to any value. In practice, such information is typically available to the compiler and/or programmer or the program. This is because the compiler/programmer has an overall view of the program and can determine which instructions will execute later. Of course, it is important that, having indicated that register MB1 is no longer required, the program does not then attempt to read from that register until a further write to that register has been made (thereby indicating that the relinquishment of the register is over).

Figure 5:
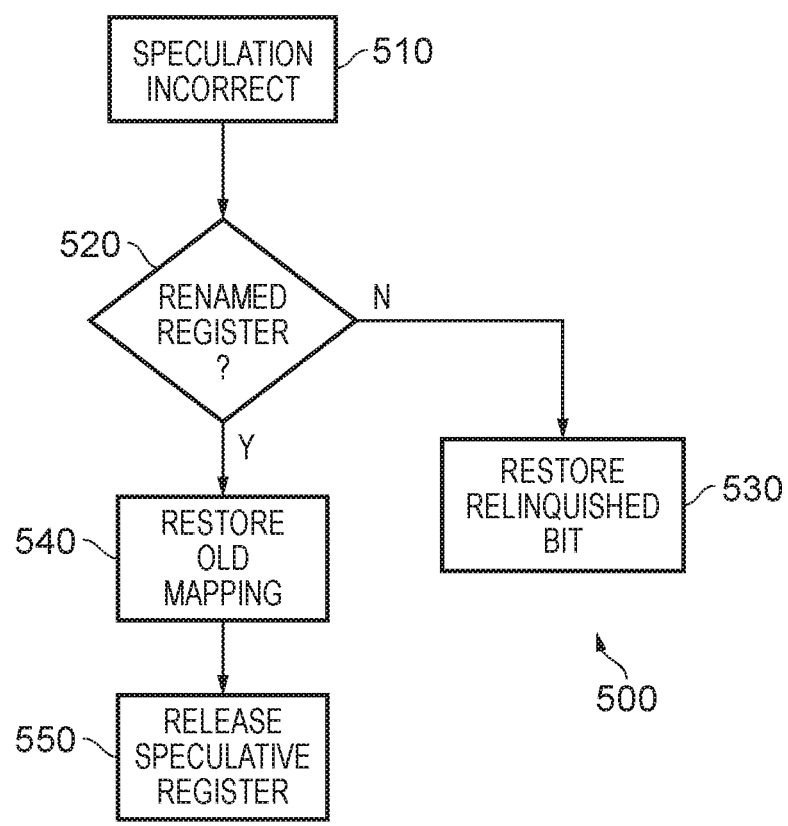
FIG. 5 shows a flowchart that illustrates a method of recovering from incorrect speculative execution in accordance with some embodiments.

FIG. 5 shows a flow chart 500 that illustrates a method of recovering from speculative execution that has occurred incorrectly in accordance with some embodiments. In particular, in FIG. 5, it is assumed that speculation occurred as a consequence of, for instance, incorrect branch predication. At a step 510, it is determined that the speculation has occurred incorrectly. At a step 520 it is determined whether the registers referred to in the instructions that have been incorrectly executed are renamed registers. If so, then at step 540 the old mapping of logical registers to physical registers is restored. That is, the older value of the register is remapped to being the current value of the register. At a step 550, the speculative register that was used to store the value is then released (e.g. is re-added to the pool of available physical registers). If, at step 520, the register is not a renamed register, then at step 530 the relinquished bit is restored. That is, if the register was written to thereby causing the relinquished bit to be erased, then the relinquished bit is restored to indicate that the register is still relinquished. For instance, in the example of FIG. 4, the relinquish bit for register MB1 is set between instructions eleven and twelve. If miss-speculation occurs and the look re-executes incorrectly, then at instruction three, the setting of the value in the register MB1 will cause the relinquished bit to be erased. Once it is then detected that speculation has occurred incorrectly, the relinquished bit must be restored, since that register is still relinquished and has not been written to since being relinquished.

The relinquish instruction can also be used to aid in context switching. Context switching occurs when the active thread or application running on a system is switched. This requires the current value of registers to be stored and for the stored values of registers associated with the thread or application being switched in to be stored back into the registers so that execution can resume from when the suspended thread (now being switched in) left off.

FIG. 6 shows an example of how context can be saved during a context switch when registers have been relinquished in accordance with some embodiments. In particular, at an instruction one, the value of the usage mask 160 that indicates the set of registers that have been relinquished is stored in a register x0. At an instruction two, the value of register x0 is then stored at a context_ptr, which is a location in memory in which the current values of the registers are being stored. The exclamation mark '!' indicates that the value of the context_ptr is then incremented. Instruction three determines whether the value one is represented in the usage mask 160. In other words, instruction three determines whether register one is relinquished or not. If register one (MA0) is relinquished, then the execution jumps to the label not_ma0. Otherwise, instruction four causes the data stored in register MA0 to be stored at the context_ptr, which is then incremented. In any event, at instruction five, it is determined whether a second register (MA1) is indicated by the usage mask 160. If so, then the program jumps to not_ma1. Otherwise, at instruction six, the value of the register MA1 is stored at the context_ptr and the context_ptr is incremented. In either event, at instruction seven, it is determined whether a third register (MB0) is indicated by the usage mask 160. If so, then the process jumps to the label not_mb0. Otherwise, at instruction eight, the value of the register MB0 is stored at the context_ptr, which is then incremented. This process is repeated for each register that can be indicated by the usage mask 160. In effect, each register is tested for in the usage mask 160. If the register is listed (indicating that the register has been relinquished and is therefore of no use), then the saving of that register is skipped. Otherwise the saving of that register is performed at the context_ptr. In addition to this, the usage mask 160 itself is saved so that the identity of the saved values is known in the future.

Figure 7:
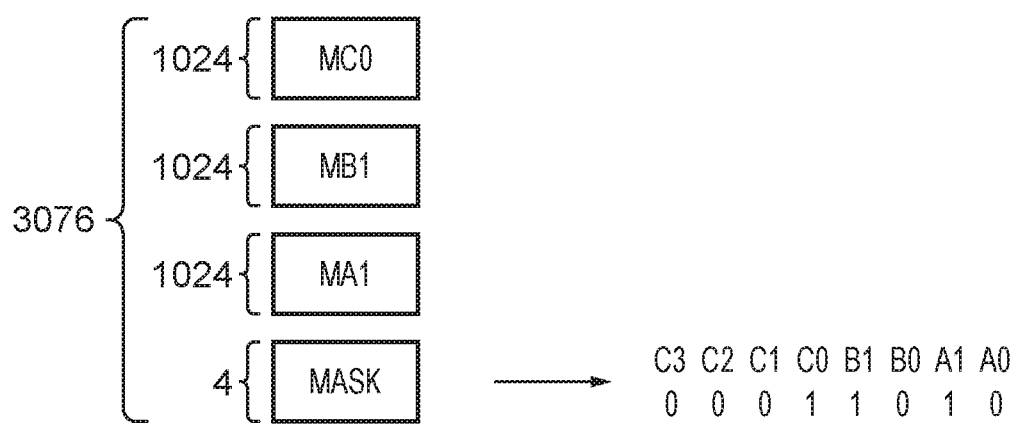
FIG. 7 provides an example of saving registers, where some registers have been relinquished, as part of a context switch in accordance with some embodiments.

FIG. 7 provides an example of the saved registers as data in memory. The first item stored is the mask 160 comprising four bytes. In this example, the mask is the value 00011010, which indicates that registers MA0, MB0, MC1, MC2, and MC3 have been relinquished and are therefore not saved. The next item on the queue is the first saved register—MA1. This is followed by the second saved register—MB1. This is followed by the third saved register—MC0. Collectively, a total of 3076 bytes are saved (with each of registers MA1, MB1, MC1 occupying 1024 bytes). This therefore creates a substantial saving in terms of both time and space. In particular, space is saved, since not all of the registers (many of which are relinquished and therefore not used) are saved. Furthermore, since not all registers are saved, the process of saving and loading the registers is sped up. By saving the registers in this manner, it is possible for the data to be read and the correct registers to be restored.

FIG. 8 shows an example of loading context during context switch when registers have been relinquished. In particular, a first instruction kill_all causes all registers to be erased. This is performed in order to prevent data from being inadvertently carried from one thread (or application) to another as a consequence of registers by the incoming threads having been relinquished. A second instruction then loads the data at a context_ptr into a register x0 and increments the context pointer. As illustrated by FIG. 7, this content will be the saved previous value of the mask 160. In this example, the previous value of the mask 160 is not directly restored, but instead is restored as a consequence of the 'kill_all' instruction followed by restoring the live registers. At an instruction three, the mask is tested to see whether a first register is relinquished or not. If the register has been relinquished, then the process jumps to not_ma0. Otherwise, an instruction four causes the data at the context_ptr to be loaded into register MA0 and for context_ptr to be incremented. In any event, at an instruction five, the mask is tested to see whether a second register (MA1) is relinquished. If so, then the process jumps to label not_ma1. Otherwise, at an instruction six, the data stored at the context_ptr is loaded into a register MA1. The context_ptr is then incremented. This process continues for each of the registers, with a test being made whether that particular register should be loaded into or not and the load being performed if appropriate (e.g. if according to the mask, the register was not relinquished). As previously mentioned, since the relinquished registers mean that less data is to be transferred, the time taken to perform the transfer can be reduced.

Figure 9:
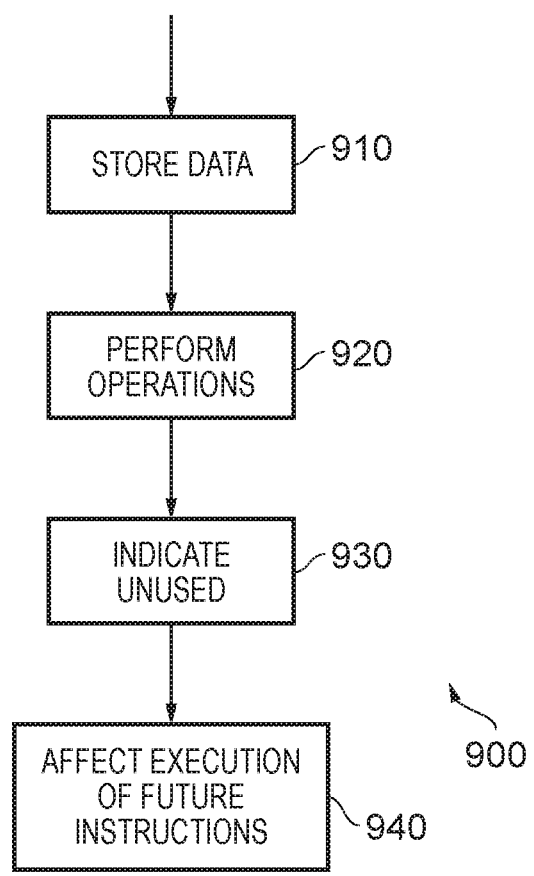
FIG. 9 shows a flowchart that illustrates a method of data processing in accordance with some embodiments.

FIG. 9 shows a flow chart that illustrates method of data processing in accordance with some embodiments. The flow chart 900 starts at step 910 in which data is stored in one or more registers. At a step 920, operations are performed using one or more of those registers. At a step 930, a relinquish instruction is used to indicate that one or more of those registers is now unused. At a step 940, execution of future instructions is effected by the indication of some of those registers being unused. For instance, this could take the form of a context switch that is performed more efficiently or using less space as a consequence of the registers being relinquished. Another example of this would be the ability to execute instructions speculatively (even in the absence of rename circuitry) as a consequence of some of those registers being relinquished.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
a plurality of storage circuits to store data; and
execution circuitry to perform one or more operations using the storage circuits in response to instructions, wherein
the instructions include a relinquish instruction;
the execution circuitry is adapted to respond to the relinquish instruction by storing a stored indication that at least one of the plurality of storage circuits is an unused storage circuit; and
the execution circuitry is adapted to determine whether or notaffect execution of future instructions is to be performed based on the stored indication that at least one of the plurality of storage circuits is the unused storage circuit after executing the relinquish instruction; and
context saving circuitry adapted to either:
inhibit saving the unused storage circuit, or
save the plurality of storage circuits other than the unused storage circuit.

2. The data processing apparatus according to claim 1, wherein
the context saving circuitry is adapted to save a set of the storage circuits in response to a context switch, wherein
the future instructions comprise one or more context switching instructions to perform the context switch.

3. The data processing apparatus according to claim 1, wherein
the context saving circuitry is adapted to save an identity of either the unused storage circuit or those of the storage circuits that are other than unused.

4. A data processing apparatus, comprising:
a plurality of storage circuits to store data;
execution circuitry to perform one or more operations using the storage circuits in response to instructions; and
issue circuitry to receive the instructions in stream order and to issue the instructions to the execution circuitry in a revised order other than the stream order,
wherein
the instructions include a relinquish instruction;
the execution circuitry is adapted to respond to the relinquish instruction by storing a stored indication that at least one of the plurality of storage circuits is an unused storage circuit;
the execution circuitry is adapted to affect execution of future instructions based on the stored indication that at least one of the plurality of storage circuits is the unused storage circuit after executing the relinquish instruction;
the stream order comprises the relinquish instruction, followed by a branch instruction, followed by a producer instruction;
the branch instruction is predicted as being taken;
the producer instruction stores a second data value in the unused storage circuit; and
the revised order causes the producer instruction to be issued before the branch instruction has been completed.

5. The data processing apparatus according to claim 4, wherein
the consumer instruction executes over a plurality of processor cycles.

6. The data processing apparatus according to claim 4, wherein
the consumer instruction is a matrix operation instruction.

7. The data processing apparatus according to claim 1, wherein
each of the plurality of storage circuits is simultaneously addressable.

8. The data processing apparatus according to claim 1, wherein
each of the plurality of storage circuits is adapted to store a plurality of data values.

9. The data processing apparatus according to claim 1, wherein
each of the plurality of storage circuits has capacity of at least 1024 bytes.

10. The data processing apparatus according to claim 1, wherein
the execution circuitry is adapted to respond to the relinquish instruction by performing at least some of the one or more operations and to indicate that the one of the plurality of storage circuits as the unused storage circuit.

11. The data processing apparatus according to claim 1, wherein
at least some of the instructions comprise a field to indicate whether that instruction is the relinquish instruction.

12. The data processing apparatus according to claim 1, comprising:
track circuitry to identify one or more unused storage circuits including the unused storage circuit.

13. The data processing apparatus according to claim 1, wherein
the storage circuits are registers; and
the unused storage circuit is an unused register in the registers.

14. A method of data processing comprising:
storing data in a plurality of storage circuits;
performing one or more operations using the storage circuits in response to instructions including a relinquish instruction;
storing a stored indication, in response to the relinquish instruction, that at least one of the plurality of storage circuits is an unused storage circuit; and
affecting executing of future instructions based on the stored indication that at least one of the plurality of storage circuits is the unused storage circuit after executing the relinquish instruction; and
either:
inhibiting saving the unused storage circuit, or saveing the plurality of storage circuits other than the unused storage circuit.

\* \* \* \* \*